Figure 1:
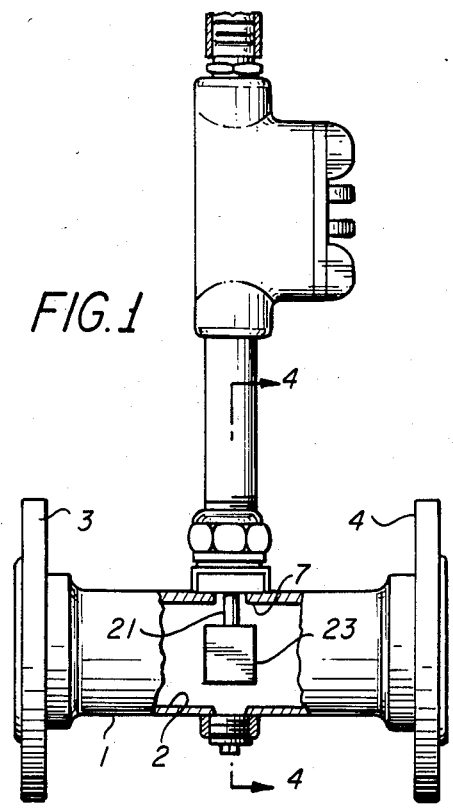

United States Patent [19]

Scarpa

[11] Patent Number: 4,604,906
[45] Date of Patent: Aug. 12, 1986

[54] FLOWMETER

[76] Inventor: Thomas J. Scarpa, 6481 Rte. 6N West, Edinboro, Pa. 16412

[21] Appl. No.: 653,301

[22] Filed: Sep. 24, 1984

[51] Int. Cl.⁴ ............................................. G01F 1/28
[52] U.S. Cl. .............................................. 73/861.74
[58] Field of Search ................... 73/861.74, 189, 186, 73/181, 861.71

[56] References Cited

U.S. PATENT DOCUMENTS 2,917,922 12/1959 Morse ............................... 73/861.71
3,298,230 1/1967 Stover ............................... 73/861.74

FOREIGN PATENT DOCUMENTS 687354 2/1940 Fed. Rep. of Germany ... 73/861.74

Primary Examiner—Donald O. Woodiel
Attorney, Agent, or Firm—Ralph Hammar

[57] ABSTRACT

A strain gage flowmeter in which the sensing element is an airfoil aligned with the flow of the fluid to be measured and the flow responsive thrust on the element is transverse to the flow. This type of flowmeter can measure accurately flow in which the ratio of maximum flow to minimum flow is 100 to 1. It also reduces wear from abrasive liquids or slurries.

8 Claims, 5 Drawing Figures

U.S. Patent   Aug. 12, 1986   4,604,906

FLOWMETER

This invention is intended to improve the accuracy, extend the range and increase the service life of flow measuring instruments.

Figure 2:
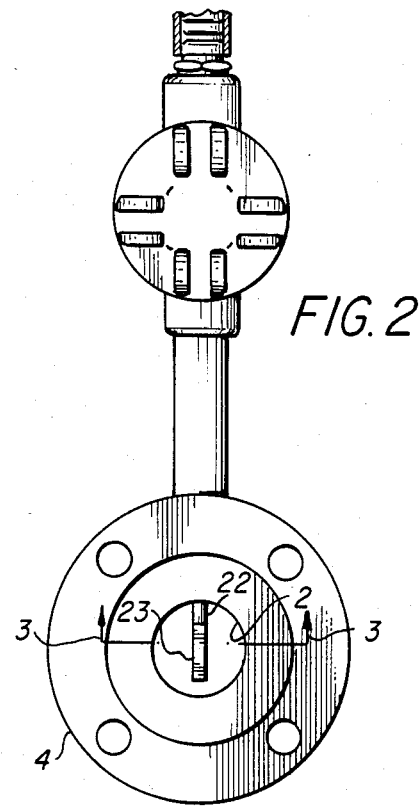
Figure 3:
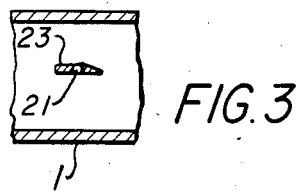
Figure 5:
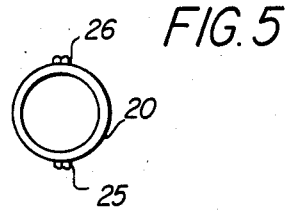
Figure 4:
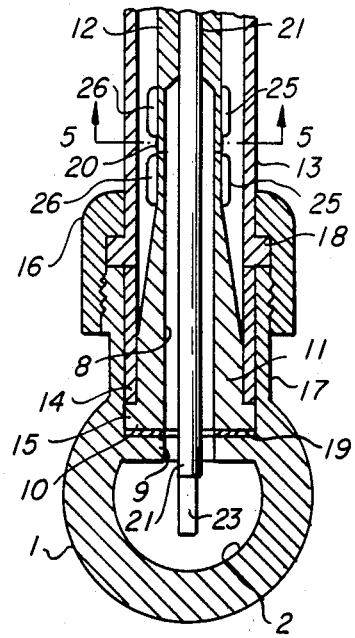

In the drawings,

FIG. 1 is an elevation partly in section through a flowmeter embodying the invention, FIG. 2 is an end view of FIG. 1, FIG. 3 is a fragmentary section on line 3—3 of FIG. 2, FIG. 4 is a section on line 4—4 of FIG. 1, and FIG. 5 is a section on line 5—5 of FIG. 4.

The instrument having a body 1 with a passageway 2 for the flow of fluid to be measured. At opposite ends of the body are couplings 3, 4 for connection to mating couplings in the line carrying the fluid. At the central section of the body is the inner end 7 of a transverse passageway 8 branching from the way 2. Around the opening 7 is an internally extending flange 9, (FIG. 4) integral with the body 1 on which is seated the lower end 10 of a tubular sensing member 11 integrally closed at its upper end by a solid section 12.

The sensing member 11 is enclosed by a cylindrical cap 13 having its lower end 14 seated on an external flange 15 on the lower end of the sensing member 11. A sleeve nut 16 screwed on boss 17 on the body engages an externally projecting rib 18 on the cap 13 and clamps the sensing element and cap to the body as the sleeve nut is tightened. A gasket 19 between the sensing element 11 and the flange 9 provies a fluid tight joint.

The sensing member 11 has a thin-walled flexing section 20 which may be of uniform wall thickness around its entire circumference as shown in FIG. 4 or which may have thin walls in a direction perpendicular to the flow to be measured and thick walls in the direction of the flow to be measured. With either variation, flexing of the section 20 is effected by a rigid lever 21 having its upper end fixed in the solid section 12 and its lower end 22 depending into the passageway 2. Preferably the lever 21 is more rigid in the direction of flow than in the direction of thrust exerted by the flow. The lever 21 could be of rectangular cross section with the width measured in the direction of flow two or more times the thickness measured in the direction of thrust due to the flow. This eliminates the need for a stop limiting the movement of the lever in the direction of flow, such as might be caused by a slug of water in a steam line. The lower end 22 of the lever 21 is fixed to the center of an airfoil 23. The airfoil might be machined or otherwise formed in the lower end of the lever. Airfoil design is well-developed and there is no technical reason why any airfoil design may not be used. Since this instrument is intended to measure flow of all sorts of fluids—liquids, gases, slurries, etc. the airfoil should be of material compatible with the fluid to be measured. Long life of the airfoil may be more important than aerodynamic efficiency. No attempt has been made to illustrate all possible airfoil designs. In the drawing, the airfoil is illustrated as a rectangular plate generally edgewise of the flow so as to offer a minimum of obstruction to flow. The thrust exerted on the plate by the flow is similar to the lift force exerted on an aircraft wing. By reason of the thrust exerted on the plate 23, the lower end of the lever 21 is pushed perpendicular to the direction of flow causing a flexing of flexing section 20. This flexing of the flexing section is measured by strain gages Nos. 25 and 26 respectively arranged on opposite sides of the neutral axis of the flexing section. Strain gages for measuring flexing are shown in U.S. Pat. No. 2,826,914. The faster the flow the greater the lift force and the greater the deflection of the flexing section measured by the strain gages. The force produced by the flow is expressed by the following equation:

$$F = d \, (V^2/2g) \, C_L A$$

where F equals the force exerted on sensing element; d equals fluid density; V=fluid velocity; g=gravitational constant; $C_L$=lift coefficient of sensor (airfoil 23); A=area of sensor upon which lift force is acting.

In the prior art the sensor is a disk arranged head-on in the flow stream and the flow produces a pressure differential across the disk. The pressure differential across the disk is expressed by the following equation:

$$F = d \, (V^2/2g) \, C_d A$$

where F is the differential force across the disk sensing element; d is the fluid density; V is the fluid velocity; g is the gravitational constant; $C_d$ is the drag coefficient of the disk and A is the area of the target disk or sensing element.

There are several advantages in using the sensing element of the present invention as compared to the disk of the prior art.

1. The head-on profile which the fluid streams sees is reduced substantially, resulting in a lower pressure drop in the instrument.

2. To increase sensitivity to low flow rates, both this invention and the prior art must increase the surface area over which the induced dynamic flow force is working. In the case of the drag force target sensor of the prior art, this can only be done by increasing the diameter of the disk which causes a greater restriction to the flow at higher velocities and produces a much larger pressure drop across the instrument. The maximum size of the disk is limited by the internal diameter of the pipe.

By way of contrast, the present invention which uses the lift force method only requires an elongation of the length of the sensing element parallel to the flow path in order to increase its effective surface area. There is no increase in the head or head-on profile which the flow stream sees and no increase in pressure loss. For small pipe diameters, especially, there is no restriction on the length of the sensor enabling a much greater sensitivity to low flow rates.

3. Abrasive and corrosive wear on the sensor can be greatly reduced due to the smaller head-on profile plus the streamlining of the forward edge. The present invention will not have its calibration affected by excessive wear.

I claim:

1. A flowmeter comprising a body having a passageway for fluid to be measured, a tubular body having its inner end open to said passageway and sealed to said first body and having its outer end closed, a rod fixed to the outer end of the tubular body and having its inner end extending to said passageway, an airfoil vane in said passageway and fixed to the inner end of said rod and oriented to produce a force on said rod transverse to the direction of fluid flow, said tubular body having a section constructed to be flexed by said force, and strain gage means for sensing the flexing of said section.

2. The flowmeter of claim 1 in which the rod is much stiffer in the direction of flow than in the direction transverse to said direction of flow.

3. The flowmeter of claim 2 in which the width of the rod is in the direction of flow and the thickness of the rod is in said direction transverse to the direction of flow.

4. The flowmeter of claim 1 in which the vane is formed in the lower end of said rod.

5. A flowmeter for measuring the flow of a stream of fluid relative to said meter comprising a tubular body havings its inner end open to said stream and having its outer end closed, a rod fixed to the outer end of the tubular body and having its inner end extending to said stream, an airfoil vane in said stream and fixed to the inner end of said rod and oriented to produce a force on said rod transverse to the direction of fluid flow, said tubular body having a section constructed to be flexed by said force, and strain gage means for sensing the flexing of said section.

6. The flowmeter of claim 5 in which the rod is much stiffer in the direction of flow than in the direction transverse to said direction of flow.

7. The flowmeter of claim 5 in which the vane is formed in the lower end of said rod.

8. The flowmeter of claim 5 in which the width of the rod is in the direction of flow and the thickness of the rod is in said direction transverse to the direction of flow.

* * * * *